(12) United States Patent
Bräuer et al.

(10) Patent No.: US 6,486,243 B2
(45) Date of Patent: Nov. 26, 2002

(54) THERMOPLASTICALLY PROCESSABLE POLYURETHANE ELASTOMERS HAVING AN IMPROVED INTRINSIC COLOR

(75) Inventors: Wolfgang Bräuer, Leverkusen (DE); Wolfgang Kaufhold, Köln (DE); Hans-Georg Hoppe, Leichlingen (DE); Hans-Georg Wussow, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/969,344

(22) Filed: Oct. 1, 2001

(65) Prior Publication Data

US 2002/0115782 A1 Aug. 22, 2002

(30) Foreign Application Priority Data

Oct. 6, 2000 (DE) .......................... 100 49 469

(51) Int. Cl.$^7$ .................................. C08K 5/49
(52) U.S. Cl. .......................... 524/120; 524/710; 528/51
(58) Field of Search .................. 524/710, 120; 528/51

(56) References Cited

U.S. PATENT DOCUMENTS

| | | | |
|---|---|---|---|
| 3,192,243 A | 6/1965 | Gagliani ................ 260/461 |
| 4,169,196 A | 9/1979 | Ehrlich et al. ............. 528/58 |
| 4,654,105 A | 3/1987 | Fesman ................... 156/308 |
| 4,677,154 A | 6/1987 | Narayan et al. ........... 524/710 |
| 5,103,035 A | 4/1992 | Elnager et al. ............ 558/96 |
| 5,200,491 A | 4/1993 | Bräuer et al. .............. 528/51 |
| 5,817,732 A | * 10/1998 | Asahina et al. |

FOREIGN PATENT DOCUMENTS

| | | |
|---|---|---|
| DE | 196 30 903 | 2/1998 |
| EP | 0 356 687 | 7/1989 |

OTHER PUBLICATIONS

The GE Specialty Chemicals monograph (month unavailable) 1997, by General Electricl Company.

* cited by examiner

Primary Examiner—Rachel Gorr
(74) Attorney, Agent, or Firm—Joseph C. Gil; Aron Preis

(57) ABSTRACT

A light-colored thermoplastic molding composition comprising a polyurethane elastomer is disclosed. The polyurethane which is the reaction product of at least one polyol, at least one organic diisocyanate and at least one polyol chain extender contains one or more pentaerythritol diphosphites color stabilizers conforming to a specific formula exhibits improved color stability and improved processability. The process for preparation entails introducing the stabilizer before the reaction has been completed.

14 Claims, No Drawings

THERMOPLASTICALLY PROCESSABLE POLYURETHANE ELASTOMERS HAVING AN IMPROVED INTRINSIC COLOR

The present invention relates to thermoplastically processable polyurethane elastomers (TPUs) having an improved intrinsic color as a result of the utilization of one or more compounds of pentaerythritol diphosphites substituted in specific manner, and to the use thereof.

Thermoplastic polyurethanes (TPUs) are widely used because they have good elastomer properties and lend themselves readily to thermoplastic further processing. A very varied range of mechanical properties may be obtained by suitable selection of components. Kunststoffe 68 (1978) 819; Kautschuk, Gummi, Kunststoffe 35, (1982) 569; G. Becker, D. Braun: Kunststoff-Handbuch [Manual of Plastics], Vol. 7, "Polyurethane [Polyurethanes]", Munich, Vienna, Carl Hanser Verlag 1983, for example, contain an overview of TPUs and their properties and uses. An overview of processes for preparing them is given in Plastikverarbeiter [Plastic Processor] 40 (1989).

TPUs are constructed from generally linear polyols such as polyester polyols or polyether polyols, organic diisocyanates and short-chain, generally bifunctional, alcohols (chain extenders). They can be prepared in batch or continuous manner.

Thermoplastic polyurethanes are susceptible to discoloration because of the raw materials on which they are based and because of the thermal treatment to which they are twice exposed during their production and processing. Yet in many TPU applications the color of the article is an important property. Discoloration caused by heat during preparation of the TPUs or during processing by injection molding or extrusion is undesirable, in particular in the case of white or light-colored articles.

In U.S. Pat. No. 4 169 196 Ehrlich et al. describe a process for the preparation of TPUs based on 4,4'-diphenylmethane diisocyanate with a phosphorus component PX3 being utilized, in which X are aryl, aryloxy and low alkoxy groups, and with a reduced quantity of tin catalysts being utilized. A triphenyl phosphite is preferably utilized. Thermally stable, color-stable TPUs are obtained thus.

The GE Specialty Chemicals monograph (1997 by General Electrical Company) also describes specific phosphites for improving the stability in processing and the color stability of thermoplastics prepared from polyolefins, polyesters, polyvinyl chloride, polycarbonate, polystyrene, ABS, polyurethanes and other elastomers. Triphenyl phosphite, a range of tri(alkylphenyl)phosphites, a hydroxyalkyl triphosphite, two substituted pentaerythritol diphosphites

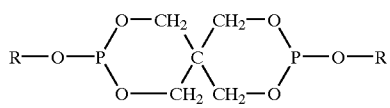

where R=stearyl and R=di(tert.-butyl)phenyl, and a substituted pentaerythritol monophosphite (R=tri(tert.-butyl) phenyl), are described.

The utilization of these phosphites reduces discoloration in thermoplastic polyurethanes during their preparation and processing.

However, the utiliation of phosphites in the preparation of TPUs also influences the reactivity (monomer reactivity) of the starting components (EP-A 0 522 340). The utilization of phosphites as color stabilizers in the preparation of TPUs is therefore problematic.

The object was to provide thermoplastically processable polyurethane elastomers which have a good intrinsic color which remains unchanged or is barely changed during preparation and/or processing.

It has now been found that TPUs having a good color (low Yellowness Index in accordance with DIN 6167) with unchanged monomer reactivity can be provided when pentaerythritol diphosphites substituted in specific manner are added to the reaction components before or during preparation of the TPUs.

The invention therefore provides light-colored thermoplastically processable polyurethane elastomers (TPUs) consisting of a reaction product which is obtainable from
  A) at least one polyol having on average a minimum of 1.8 and a maximum of 3.0 Zerewitinoff-active hydrogen atoms and an average molecular weight Mn of 450 to 10000,
  B) at least one organic diisocyanate and
  C) at least one polyol having on average a minimum of 1.8 and a maximum of 3.0 Zerewitinoff-active hydrogen atoms and an average molecular weight Mn of 60 to 400,
wherein the NCO/OH ratio of the reaction components A), B) and C) which is used is between 0.85 and 1.2,
and from 0 to 20 wt. %, in relation to the quantity of TPU, of further auxiliary substances and additives (D),
as well as from 0.001 to 1 wt. %, in relation to the quantity of TPU, of one or more color stabilizers from the group comprising pentaerythritol diphosphites (E) corresponding to the formula (I)

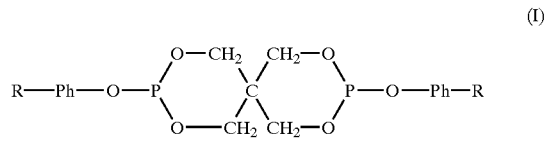

wherein
  R=$C_6$ to $C_{30}$-alkyl, in particular $C_6$ to $C_{20}$-alkyl, and Ph denotes phenyl.

The TPUs according to the invention preferably have a Yellowness Index (measured in accordance with DIN 6167) of less than 9, in particular of less than 8.

Aliphatic, cycloaliphatic, araliphatic, aromatic and heterocyclic diisocyanates or any mixtures of these diisocyanates may be used as organic diisocyanates (B) (cf. HOUBEN-WEYL "Methoden der organischen Chemie" [Organic Chemistry Methods], Vol. E20 "Makromolekulare Stoffe [Macromolecular Substances]", Georg Thieme Verlag, Stuttgart, New York 1987, pp. 1587–1593 or Justus Liebig's Annalen der Chemie [Annals of Chemistry], 562, pp. 75 to 136).

The following might be named in detail as examples: aliphatic diisocyanates such as ethylene diisocyanate, 1,4-tetramethylene diisocyanate, 1,6-hexamethylene diisocyanate, 1,1 2-dodecane diisocyanate; cycloaliphatic diisocyanates such as isophorone diisocyanate, 1,4-cyclohexane diisocyanate, 1-methyl-2,4-cyclohexane diisocyanate and l-methyl-2,6-cyclohexane diisocyanate as well as the corresponding isomer mixtures, 4,4'-dicyclohexylmethane diisocyanate, 2,4'-dicyclohexylmethane diisocyanate and 2,2'-dicyclohexylmethane diisocyanate as well as the corresponding isomer mixtures; furthermore aromatic diisocyanates such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates or 2,4'-diphenylmethane diisocyanates, 4,4'-diisocyanate- 1,2-diphenylethane and 1,5-naphthylene diisocyanate. 1,6-Hexamethylene diisocyanate, 1,4-cyclohexane diisocyanate, isophorone diisocyanate, dicyclohexylmethane diisocyanate, diphenylmethane diisocyanate isomer mixtures having a 4,4'-diphenylmethane diisocyanate content of more than 96 wt. % and in particular 4,4'-diphenylmethane diisocyanate and 1,5-naphthylene diisocyanate, are used for preference. The named diisocyanates may be used individually or in the form of intermixtures. They may also be used together with up to 15 mol % (in relation to total diisocyanate) of a polyisocyanate, however polyisocyanate may be added only in a quantity such that a product which is still thermoplastically processable arises. Examples of polyisocyanates are triphenylmethane-4,4',4''-triisocyanate and poly-phenyl-polymethylene polyisocyanates.

Zerewitinoff-active polyols (A) utilized in the products according to the invention are those such as have on average a minimum of 1.8 and a maximum of 3.0 Zerewitinoff-active hydrogen atoms and an average molecular weight $\overline{M}_n$ of 450 to 10000.

Besides compounds having amino groups, thiol groups or carboxyl groups, compounds having in particular two to three, preferably two, hydroxyl groups, are included, specifically those such as have average molecular weights $\overline{M}_n$ of 450 to 6000, particularly preferably those such as have an average molecular weight $\overline{M}_n$ of 600 to 4500, for example polyesters, polyethers, polycarbonates and polyester amides having hydroxyl groups.

Suitable polyether diols may be prepared by reacting one or more alkylene oxides having 2 to 4 carbon atoms in the alkylene radical with a starter molecule which comprises two bonded active hydrogen atoms. The following might be named as alkylene oxides, for example: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are used for preference. The alkylene oxides may be used individually, in an alternating sequence or as mixtures. The following are considered as the starter molecules, for example: water, amino alcohols such as N-alkyldiethanolamines, for example N-methyldiethanolamine, and diols such as ethylene glycol, 1,3-propylene glycol, 1,4-butanediol and 1,6-hexanediol. Mixtures of starter molecules may optionally also be utilized. Suitable polyetherols are moreover the polymerization products of tetrahydrofuran which comprise hydroxyl groups. Trifunctional polyethers may also be utilized in proportions of from 0 to 30 wt. %, in relation to the bifunctional polyethers, however only in a quantity such that a product which is still thermoplastically processable arises. For preference the substantially linear polyether diols have average molecular weights $\overline{M}_n$ of 450 to 6000. They may be used both individually and in the form of intermixtures.

Suitable polyester diols may, for example, be prepared from dicarboxylic acids having 2 to 12 carbon atoms, for preference 4 to 6 carbon atoms, and polyhydric alcohols. Examples of dicarboxylic acids which are considered are: aliphatic dicarboxylic acids such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids may be used individually or as mixtures, for example in the form of a succinic, glutaric and adipic acid mixture. It may optionally be advantageous for preparing the polyester diols to use in place of the dicarboxylic acids the corresponding dicarboxylic acid derivatives such as carboxylic acid diesters having 1 to 4 carbon atoms in the alcohol radical, carboxylic acid anhydrides or carboxylic acid chlorides. Examples of polyhydric alcohols are glycols having 2 to 10, for preference 2 to 6 carbon atoms, for example ethylene glycol, diethylene glycol, 1,4-butanediol, 1,5-pentanediol, 1,6-hexanediol, 1,10-decanediol, 2,2-dimethyl-1,3-propanediol, 1,3-propanediol or dipropylene glycol. Depending on the desired properties, the polyhydric alcohols may be used alone or in intermixture. Esters of carbonic acid with the named diols, in particular those such as have 4 to 6 carbon atoms, such as 1,4-butanediol or 1,6-hexanediol, condensation products of ω-hydroxycarboxylic acids such as ω-hydroxyhexanoic acid or polymerisation products of lactones, for example optionally substituted ω-caprolactones, are moreover suitable. Ethanediol polyadipates, 1,4-butanediol polyadipates, ethanediol-1,4-butanediol polyadipates, 1,6-hexanediol neopentyl glycol polyadipates, 1,6-hexanediol- 1,4-butanediol polyadipates and polycaprolactones are used for preference as the polyester diols. The polyester diols have average molecular weights $\overline{M}_n$ of 450 to 6000 and may be used individually or in the form of intermixtures.

Zerewitinoff-active polyols (C) are so-called chain extenders and have on average 1.8 to 3.0 Zerewitinoff-active hydrogen atoms and a molecular weight of 60 to 400. These are understood to be compounds having two to three, preferably two hydroxyl groups, besides those having amino groups, thiol groups or carboxyl groups.

For preference aliphatic diols having 2 to 14 carbon atoms, such as, for example, ethanediol, 1,2-propanediol, 1,3-propanediol, 1,4-butanediol, 2,3-butanediol, 1,5-pentanediol, 1,6-hexanediol, diethylene glycol and dipropylene glycol are utilised as the chain extenders. However, diesters of terephthalic acid with glycols having 2 to 4 carbon atoms, for example terephthalic acid bisethylene glycol or terephthalic acid bis1,4-butanediol, hydroxyalkylene ethers of hydroquinone, for example 1,4-di(β-hydroxyethyl) hydroquinone, ethoxylated bisphenols, for example 1,4-di(β-hydroxyethyl) bisphenol A, (cyclo)aliphatic diamines such as isophorone diamine, ethylene diamine, 1,2-propylene diamine, 1,3-propylene diamine, N-methylpropylene-1,3-diamine, N,N'-dimethylethylene diamine and aromatic diamines such as 2,4-tolylene diamine, 2,6-tolylene diamine, 3,5-diethyl-2,4-tolylene diamine or 3,5-diethyl-2,6-tolylene diamine or primary mono-, di-, tri- or tetraalkyl-substituted 4,4'-diaminodiphenyl methanes are also suitable. Ethanediol, 1,4-butanediol, 1,6-hexanediol, 1,4-di(β-hydroxyethyl) hydroquinone or 1,4-di(β-hydroxyethyl) bisphenol A are particularly preferably used as the chain extenders. Mixtures of the aforementioned chain extenders may also be utilized. Smaller quantities of triols may additionally be added.

Compounds which are monofunctional with regard to isocyanates may be utilized in proportions of up to 2 wt. %, in relation to TPU, as the so-called chain terminators. Monoamines such as butylamine and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether, for example, are suitable.

The relative quantities of the compounds (A) and (C) are preferably selected such that the ratio of the sum of the isocyanate groups in (B) to the sum of the Zerewitinoff-active hydrogen atoms in (A) and (C) is from 0.85:1 to 1.2:1, preferably 0.95:1 to 1.1:1.

The thermoplastic polyurethane elastomers according to the invention may comprise as auxiliary substances and additives (D) up to a maximum of 20 wt. %, in relation to the quantity of TPU, of the conventional auxiliary substances and additives. Typical auxiliary substances and additives are catalysts, pigments, dyes, flame retardants, anti-ageing and weathering stabilizers, plasticizers, lubricants and mould release agents and fungistats and bacteriostats, as well as fillers and mixtures thereof.

Suitable catalysts according to the invention are the conventional tertiary amines known from the prior art, such as, for example, triethylamine, dimethyl cyclohexylamine, N-methyl morpholine, N,N'-dimethyl piperazine, 2-(dimethylaminoethoxy) ethanol, diazabicyclo[2,2,2] octane and the like, as well as in particular organic metal compounds such as titanic acid esters, iron compounds or tin compounds such as tin diacetate, tin dioctoate, tin dilaurate or the tin dialkyl salts of aliphatic carboxylic acids, such as dibutyltin diacetate or dibutyltin dilaurate or the like. The preferred catalysts are organic metal compounds, in particular titanic acid esters, iron compounds and tin compounds. The total catalyst quantity in the TPUs according to the invention is generally from about 0 to 5 wt. %, preferably 0 to 2 wt. %, in relation to the quantity of TPU.

Examples of further additives are lubricants such as fatty acid esters, metal soaps thereof, fatty acid amides, fatty acid ester amides and silicone compounds, anti-blocking agents, inhibitors, hydrolysis stabilizers and light, heat and discoloration stabilizers, flame retardants, dyes, pigments, inorganic and/or organic fillers and reinforcing agents. The reinforcing agents are in particular fibrous reinforcing materials such as, for example, inorganic fibers prepared in accordance with the prior art, which may also be provided with a size. More detailed information regarding the named auxiliary substances and additives may be found in the specialist literature, for example the monograph by J. H. Saunders and K. C. Frisch, "High Polymers", Vol. XVI, Polyurethane, Parts 1 and 2, Interscience Publishers 1962 and 1964, respectively, the Taschenbuch für Kunststoff-Additive [Manual of Plastics Additives] by R. Gächter and H. Müller (Hanser Verlag Munich 1990) or DE-A 29 01 774.

Further additions which may be incorporated in the TPU are thermoplastics, for example polycarbonates and acrylonitrile/butadiene/styrene terpolymers, in particular ABS. Other elastomers such as rubber, ethylene/vinyl acetate copolymers and styrene/butadiene copolymers as well as other TPUs may also be used.

Conventional commercial plasticizers such as phosphates, phthalates, adipates, sebacates and alkylsulfonic acid esters are further suitable for incorporation.

The color stabilizers (E) which are utilized are substituted pentaerythritol diphosphites

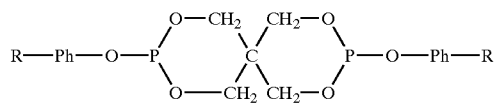

in which R=$C_6$ to $C_{30}$-alkyl, preferably $C_6$ to $C_{20}$-alkyl, and Ph denotes phenyl.

The following should be named as examples: bis (hexylphenyl) pentaerythritol diphosphite, bis(octylphenyl) pentaerythritol diphosphite, bis(nonylphenyl) pentaerythritol diphosphite, bis(decylphenyl) pentaerythritol diphosphite, bis(stearylphenyl) pentaerythritol diphosphite, bis(2,4-hexylphenyl) pentaerythritol diphosphite and bis(2, 4-nonylphenyl) pentaerythritol diphosphite.

The named compounds may be used individually, as isomer mixtures or in the form of intermixtures.

They are utilized at concentrations of from 0.001 to 1 wt. %, in relation to the quantity of TPU, preferably 0.01 to 0.5 wt. %.

For preference the color stabilizers are added to the reaction components, preferably to the polyol, before the reaction. They may, however, also be dispensed directly into the extruder, for example in the case of continuous preparation of TPUs in an extruder.

The invention also provides a process for the preparation of the thermnoplastically processable polyurethane elastomers according to the invention, which is characterized in that the components A), B) and C) are reacted, the components D) are added before, during or after the reaction in a quantity of from 0 to 20 wt. %, in relation to the quantity of TPU, and the components E) are added before or during the reaction in a quantity of from 0.001 to 1 wt. %, in relation to the quantity of TPU, wherein the NCO/OH ratio of the components A), B) and C) which are utilized is between 0.85 and 1.2, and in that the product thus obtained is then molded.

The TPUs may be prepared in batch or continuous manner. In the continuous preparation, the TPUs according to the invention may be prepared, for example, by the mixing head/band-type process or the so-called extruder process. In the extruder process, for example in a multi-screw extruder, the components A), B) and C) may be dispensed in simultaneous manner, that is to say, by the one-shot process, or sequentially, that is to say by a prepolymer process. Here, the prepolymer may take the form of an initial batch, and it may also be prepared in continuous manner in a part of the extruder or in a separate prepolymer unit upstream.

The TPU according to the invention may optionally be further worked, for example by annealing of the polymer in the form of sheets or blocks, comminution or granulation in shredders or mills, and de-gassing, as well as granulation with melting. The polymer is preferably guided through a unit for continuous de-gassing and strand formation. This unit may be constituted, for example, by a multi-screw machine equipped if possible with no or few kneading elements.

The TPUs according to the invention are utilized for the production of injection molded articles and extruded articles.

The TPUs to which the color stabilizers have been added have good mechanical and elastic properties. Surprisingly, they have in addition very low to zero optically visible coloration, in comparison with known TPUs to which phosphites have been added, while at the same time retaining the monomer reactivity. The Yellowness Index of the TPUs according to the invention, measured in accordance with DIN 6167, is less than 9.

The Yellowness Index is also still less than 9 after the further processing steps of injection molding or extrusion, such as are conventional for a TPU.

The invention will be explained in greater detail by reference to the Examples which follow.

EXAMPLES 1 to 11

In a pot 57.7 parts by weight of a polybutylene oxide (average molecular weight approx. 1000) are heated to 170° C. with 0.30 parts by weight pentaerythrityl tetrakis(3-(3,5- bis1,1-dimethyl)-4-hydroxyphenyl) propionate, 0.18 parts by weight 2-(2'-hydroxy-5'-methylphenyl) benzotriazole, (the propionate and benzotriazole believed to have no criticality in the present context) the respective quantity of color stabilizer (see Table) and 20 ppm (in relation to polybutylene oxide) tin dioctoate (catalyst). With stirring, 26.7 parts by weight 4,4'-diphenylmethane diisocyanate (60° C.) are added rapidly. The reaction mixture reaches a temperature maximum (prepolymer formation).

The time taken to reach this temperature maximum is shown in the Table as the measure of reactivity. That is to say, the shorter the time, the more reactive the system.

After approx. 90 sec, a further 8.1 parts by weight diphenylmethane diisocyanate (60° C.) are added. 10 sec later, 7.0 parts by weight 1,4-butanediol are dispensed-in. After a further 10 to 15 sec, the reaction mixture is poured onto a coated metal sheet. Post-annealing takes place at 110° C. for 30 min, and a TPU sheet with a smooth surface is obtained on cooling.

EXAMPLES 12 and 13

In a pot 24.8 parts by weight of a polybutylene oxide (average molecular weight approx. 1000) are mixed by stirring until homogeneous with 0.50 parts by weight pentaerythrityl tetrakis(3-(3,5-bis1,1-dimethyl)-4-hydroxyphenyl) propionate, 0.3 parts by weight 2-(2'-hydroxy-5'-methylphenyl) benzotriazole, (the propionate and benzotriazole believed to have no criticality in the present context) the respective quantity of color stabilizer (see Table) and 29.0 parts by weight 1,6-hexanediol), and heated to 90° C. With stirring, 45.4 parts by weight 1,6-hexamethylene diisocyanate (likewise 90° C.) are added. After stirring for approx. 10 sec, 100 ppm (in relation to polybutylene oxide) dibutyltin dilaurate (catalyst) are added, and stirring is continued. After the temperature maximum or maximum torque (highly viscous but still pourable) is reached, the reaction mixture is poured onto a coated metal sheet. Post-annealing takes place at 110° C. for 30 min, and a TPU sheet with a smooth surface is obtained on cooling.

The time taken to reach the temperature maximum is shown in the Table as the measure of reactivity.

Determination of the Yellowness Index

The Yellowness Index (as the measure of coloration) is measured on the smooth surface of the TPU sheet which has been poured onto the metal sheet and cured.

The Yellowness Index is determined using the Minolta Chroma Meter CR-100 on the test specimens.

The Yellowness Index is determined in accordance with DIN 6167.

The instrument is calibrated on principle before each measurement series. When the measuring flash has been triggered, the display must indicate the values:

| 91.1 | 0.317 | 0.335 |
|---|---|---|
| Y | x | y | which are marked on the back on the white calibration plate.

If the value pairs differ from these the instrument must be calibrated according to the manufacturer's directions. The reference Yellowness Index of the calibration plate is 3.75.

The Yellowness Index G is calculated as follows:

$$G=(((2.45*x-1.149)/y)+1.149)*100$$

In order to determine the Yellowness Index the test specimen is laid on the white ceramic reference plate such that the central regions are superimposed. The measuring flash is then triggered.

The x and y values are read off, and the Yellowness Index (G) is calculated using the formula above.

The following color stabilizers were used:

| Color Stabilizer | Name | Manufacturer | Structure |
|---|---|---|---|
| 1 | | | Formula 1 |
| 2 | Irgafos ® P-EPQ | Ciba Specialty Chemicals Inc. | -(Ph-P-(OPh-$R_2$)$_2$)$_2$ R = tert.-butyl |
| 3 | Weston ® TPP | General Electric Company (GE) | Triphenyl phosphite |
| 4 | Weston ® 399 | GE | Tris(nonylphenyl) phosphite |
| 5 | Ultranox ® 641 | GE | Formula 2 |
| 6 | Ultranox ® 626 | GE | Formula 3 |
| 7 | Weston ® 619 | GE | Formula 4 |
| 8 | ADK-Stab. PEP-4C | Asahi Denka Kogyo K.K. | Formula 5 |

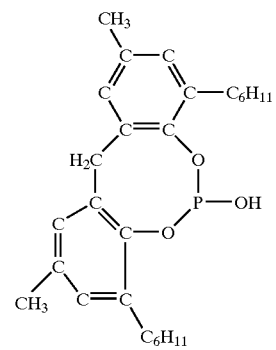

Formula 1

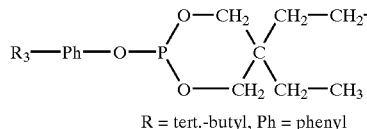

Formula 2

R = tert.-butyl, Ph = phenyl

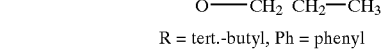

Formula 3

R = tert.-butyl, Ph = phenyl

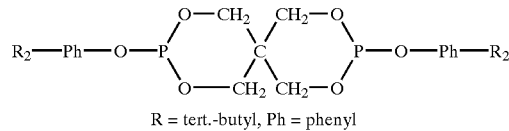

Formula 4

R = stearyl

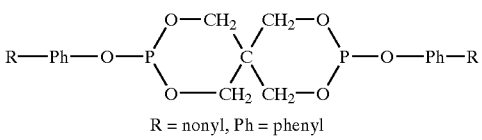

Formula 5

R = nonyl, Ph = phenyl

TABLE

Results

| Example | Color stabilizer | Quantity as wt. %, in relation to TPU | Time $t_{max}$ [sec] Prepolymer reaction | Yellowness Index |
|---|---|---|---|---|
| 1* | none | 0 | 50 | 23 |
| 2* | 1 | 0.06 | 100 | 13 |
| 3* | 2 | 0.06 | 50 | 12 |
| 4* | 3 | 0.06 | 42 | 11 |
| 5* | 4 | 0.06 | 48 | 17 |
| 6* | 5 | 0.06 | 43 | 10 |
| 7* | 6 | 0.06 | 40 | 11 |
| 8* | 7 | 0.06 | 50 | 9 |
| 9 | 8 | 0.06 | 52 | 6 |
| 10 | 8 | 0.15 | 50 | 5 |
| 11 | 8 | 0.30 | 60 | 3 |
| 12* | none | 0 | 110 | 18 |
| 13 | 8 | 0.21 | 115 | 8 |

*denotes a comparative example.

What is claimed is:

1. A light-colored thermoplastic molding composition comprising the reaction product of A, B and C where
    A) is at least one polyol having on average 1.8 to 3.0 Zerewitinoff-active hydrogen atoms and a number average molecular weight of 450 to 10,000, and
    B) is at least one organic diisocyanate and
    C) is at least one polyol having on average 1.8 to 3.0 Zerewitinoff-active hydrogen atoms and a number average molecular weight of 60 to 400,
        wherein the ratio NCO/OH of A), B) and C) is between 0.85 and 1.2 to obtain a polyurethane elastomer, and 0 to 20% of an auxiliary substance or additive (D), and
        0.001 to 1%, of one or more color stabilizers (E) selected from the group consisting of pentaerythritol diphosphites corresponding to the formula (I)

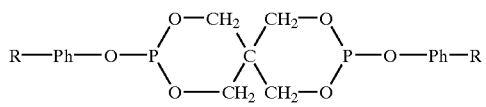
(I)

wherein
R is $C_6$ to $C_{30}$-alkyl and Ph denotes phenyl, said percents, both occurrences, being in relation to the weight of the elastomer.

2. The composition of claim 1 wherein R denotes $C_6$ to $C_{20}$-alkyl.

3. The composition of claim 1 wherein the diisocyanate B) is an aromatic diisocyanate or an aliphatic diisocyanate.

4. The composition of claim 1 wherein the polyol C) is at least one member selected from the group consisting of ethylene glycol, butanediol, hexanediol, 1,4-di-(β-hydroxyethyl) hydroquinone and 1,4-di(β-hydroxyethyl) bisphenol A.

5. The composition of claim 1 wherein pentaerythritol diphosphite E) is present in an amount of 0.01 to 0.5%.

6. The composition of claim 1 wherein said A) is polyether polyol.

7. A method of using the composition of claim 1 comprising producing molded articles by injection molding or by extrusion.

8. A process for preparing a light-colored thermoplastic molding composition comprising the product of the reaction of A, B and C where
    A) is at least one polyol having on average 1.8 to 3.0 Zerewitinoff-active hydrogen atoms and a number average molecular weight of 450 to 10,000, and
    B) is at least one organic diisocyanate and
    C) is at least one polyol having on average 1.8 to 3.0 Zerewitinoff-active hydrogen atoms and a number average molecular weight of 60 to 400,
        wherein the ratio NCO/OH of A), B) and C) is between 0.85 and 1.2 to obtain a polyurethane elastomer,
        and introducing to the reaction before it has been completed 0.001 to 1%, in relation to the weight of said A, B and C, of one or more color stabilizers E, selected from the group consisting of pentaerythritol diphosphites corresponding to the formula (I)

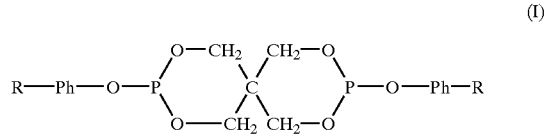
(I)

wherein
R is $C_6$ to $C_{30}$-alkyl and Ph denotes phenyl.

9. The process of claim 8 wherein R denotes $C_6$ to $C_{20}$-alkyl.

10. The process of claim 8 wherein the diisocyanate B) is an aromatic diisocyanate or an aliphatic diisocyanate.

11. The process of claim 8 wherein the polyol C) is at least one member selected from the group consisting of ethylene glycol, butanediol, hexanediol, 1,4-di-(13-hydroxyethyl) hydroquinone and 1,4-di(β-hydroxyethyl) bisphenol A.

12. The process of claim 8 wherein pentaerythritol diphosphite E) is present in an amount of 0.01 to 0.5%.

13. The process of claim 8 wherein said A) is polyether polyol.

14. The composition prepared by the process of claim 8.

* * * * *